(12) United States Patent
Wilson

(10) Patent No.: US 8,286,934 B2
(45) Date of Patent: *Oct. 16, 2012

(54) DUAL BY-PASS FOR DIAPHRAGM TYPE FLUSHOMETERS

(75) Inventor: John R. Wilson, Naperville, IL (US)

(73) Assignee: Sloan Valve Company, Franklin Park, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/164,421

(22) Filed: Jun. 20, 2011

(65) Prior Publication Data

US 2011/0248197 A1 Oct. 13, 2011

Related U.S. Application Data

(63) Continuation of application No. 12/177,813, filed on Jul. 22, 2008, now Pat. No. 7,980,528.

(60) Provisional application No. 60/954,749, filed on Aug. 8, 2007.

(51) Int. Cl.
*F16K 31/12* (2006.01)

(52) U.S. Cl. ......................................................... 251/40

(58) Field of Classification Search .................... 251/38, 251/40, 45, 46, 331
See application file for complete search history.

(56) References Cited

U.S. PATENT DOCUMENTS

| | | |
|---|---|---|
| 2,472,576 A | 6/1949 | Dobrick |
| 3,391,900 A * | 7/1968 | Erickson ........................ 251/120 |
| 3,400,731 A | 9/1968 | McCornack |
| 3,674,237 A | 7/1972 | Heyer et al. |
| 3,695,288 A | 10/1972 | Billeter et al. |
| 4,108,134 A | 8/1978 | Malec |
| 4,272,052 A | 6/1981 | Gidner |
| 4,327,891 A | 5/1982 | Allen et al. |
| 4,437,493 A | 3/1984 | Okuda et al. |
| 4,659,059 A | 4/1987 | Morris et al. |
| 4,699,351 A | 10/1987 | Wells |
| 4,872,638 A | 10/1989 | Thompson et al. |
| 4,899,778 A | 2/1990 | Laube |
| 5,026,021 A | 6/1991 | Pino |
| 5,048,790 A | 9/1991 | Wells |
| 5,082,239 A | 1/1992 | Feild |
| 5,169,118 A | 12/1992 | Whiteside |
| 5,213,305 A | 5/1993 | Whiteside et al. |
| 5,244,179 A | 9/1993 | Wilson |
| 5,295,654 A | 3/1994 | Laube |
| 5,295,655 A | 3/1994 | Wilson et al. |
| 5,335,694 A | 8/1994 | Whiteside |
| 5,415,374 A | 5/1995 | Carroll et al. |
| 5,417,402 A | 5/1995 | Speybroeck |
| 5,427,351 A | 6/1995 | Körfgen et al. |

(Continued)

OTHER PUBLICATIONS

Prosecution history for U.S. Appl. No. 11/420,492, filed May 26, 2006.

*Primary Examiner* — Eric Keasel

(74) *Attorney, Agent, or Firm* — Foley & Lardner LLP

(57) ABSTRACT

A flush valve diaphragm is provided. The diaphragm includes at least two by-passes orifices. Each by-pass orifice in the diaphragm has a by-pass associated therewith. Each by-pass having a passage therethrough, allows communication with the control chamber above the diaphragm with an inlet chamber below the diaphragm. The diaphragm also integrates the function of locating and providing sealing means to the flush valve system's aux valve mechanism.

20 Claims, 4 Drawing Sheets

U.S. PATENT DOCUMENTS

| | | | |
|---|---|---|---|
| 5,431,181 | A | 7/1995 | Saadi et al. |
| 5,456,279 | A | 10/1995 | Parsons et al. |
| 5,476,244 | A | 12/1995 | Carroll et al. |
| 5,649,686 | A | 7/1997 | Wilson |
| 5,655,748 | A | 8/1997 | Regelbrugge et al. |
| 5,730,415 | A | 3/1998 | Gronwick |
| 5,738,138 | A | 4/1998 | Grunert et al. |
| 5,755,253 | A | 5/1998 | Gronwick |
| 5,865,420 | A | 2/1999 | Wilson |
| 5,881,993 | A | 3/1999 | Wilson et al. |
| 5,887,848 | A | 3/1999 | Wilson |
| 5,904,334 | A * | 5/1999 | Grunert et al. ............... 251/120 |
| 6,182,689 | B1 | 2/2001 | Lauer et al. |
| 6,216,730 | B1 | 4/2001 | Hall |
| 6,260,576 | B1 | 7/2001 | Allen |
| 6,299,127 | B1 | 10/2001 | Wilson |
| 6,299,128 | B1 | 10/2001 | Verdecchia |
| 6,408,873 | B1 | 6/2002 | Hall et al. |
| 6,467,750 | B2 | 10/2002 | Verdecchia |
| 6,550,744 | B2 | 4/2003 | Nortier |
| 6,616,118 | B2 | 9/2003 | Nortier |
| 6,616,119 | B2 | 9/2003 | Wilson |
| 6,659,373 | B1 * | 12/2003 | Heren et al. ............... 239/570 |
| 6,913,239 | B2 | 7/2005 | Nortier |
| 6,959,905 | B2 | 11/2005 | Bush |
| 6,971,634 | B2 | 12/2005 | Funari et al. |
| 7,108,240 | B2 | 9/2006 | Funari et al. |
| 7,192,002 | B2 | 3/2007 | Nortier |
| 7,516,938 | B2 | 4/2009 | Funari et al. |
| 2002/0005500 | A1 | 1/2002 | Verdecchia |
| 2002/0179871 | A1 | 12/2002 | Verdecchia |
| 2007/0272887 | A1 | 11/2007 | Carroll et al. |
| 2009/0039299 | A1 | 2/2009 | Wilson |

* cited by examiner

DUAL BY-PASS FOR DIAPHRAGM TYPE FLUSHOMETERS

CROSS-REFERENCE TO RELATED PATENT APPLICATIONS

This application is a continuation of U.S. patent application Ser. No. 12/177,813, filed Jul. 22, 2008. U.S. patent application Ser. No. 12/177,813 claims priority to U.S. Provisional Application No. 60/954,749, filed Aug. 8, 2007. The contents of both applications are incorporated herein by reference in their entirety.

FIELD OF THE INVENTION

The present invention relates generally to the field of valves. More particularly to a diaphragm type flushometer, typically for use in a urinal or water closet or the like.

BACKGROUND OF THE INVENTION

Prior art flushometers have included a two part diaphragm-disc assembly. The diaphragm plate was typically a rubber component with a metallic core (for support). The diaphragm serves to control the main (primary) water flow through a flushometer by the use of a bypass. The relief valve seat was a separate component that engaged with the diaphragm. In prior art devices, the relief valve seat typically was an additional part also rubber molded around a metallic base.

As lower flush volume fixtures have become necessary and popular, there is a need for flushometers to deliver tighter variability to each flush delivered. This requires tighter control over the components which in-turn give tighter control over the flush profile (both total volume per flush and volume per time.)

SUMMARY OF THE INVENTION

In one embodiment, the invention provides for a reduced part count when assembled as a flush valve, thus providing the associated benefits of reduced parts such as lower cost, ease of maintenance and easy of assembly. The diaphragm of the present invention includes, in one aspect, a plurality of bypasses, in another aspect a singular diaphragm with integrated relief valve seat and in yet another aspect an improved mechanism for sealing the components of the diaphragm kit via the use of retainer.

In one embodiment, the invention relates to a flush valve system comprising a flush valve body having a water inlet and a water outlet, the water inlet positioned on a side of the flush valve body and the water outlet positioned at a bottom of the flush valve body. The system further includes a barrel, having a hollow passage, disposed within the flush valve body, the barrel forming a vertical pathway for water from the water inlet to pass to the water outlet, a skirt of the barrel and the flush valve body in communication to form a seal between the water inlet and the water outlet and the flush valve body defining an inlet chamber. A diaphragm is disposed at an upper end of the barrel, sealing the inlet chamber from the hollow passage and the diaphragm defining a control chamber above the diaphragm. The diaphragm has a top surface, a bottom surface, and a side and having a central aperture, the diaphragm further including a plurality of by-pass apertures therethrough. Each of the plurality of by-pass apertures is configured to retain a by-pass, the by-pass providing a passage from the inlet chamber to the control chamber allowing equilibration of pressure. A relief valve retention ring circumscribes the central aperture and extends from the top surface of the diaphragm. The relief valve retention ring has a plurality of relief valve lugs protruding from an inner surface of the relief valve retention ring towards the central aperture. The relief valve seat is positioned on the top surface, and the relief valve seat is positioned between the relief valve retention ring and the central aperture. A relief valve is seated on the diaphragm and has a valve stem extending downward therefrom through the diaphragm into and extending beyond a guide. The guide is coupled to the diaphragm and extending downward from the diaphragm into the barrel, the guide being a generally cylindrical hollow tube in communication with the central aperture.

In another embodiment in the form of a flush valve diaphragm kit, the kit comprises a diaphragm having substantially a disk-shape with a top surface, a bottom surface, and a side, with a radius of the diaphragm being substantially greater than a height of the diaphragm. The diaphragm has a central aperture positioned substantially centrally through the diaphragm and a plurality of by-pass apertures are disposed in the diaphragm, the plurality of by-pass apertures comprising passages through the diaphragm. The kit further includes a plurality of by-passes and each by-pass aperture has a by-pass associated therewith and retainably disposable therein. A relief valve retention ring circumscribes the central aperture and extends from the top surface of the diaphragm. The relief valve retention ring has a plurality of relief valve guides protruding from an inner surface of the relief valve retention ring towards the central aperture. A relief valve seat is positioned on the top surface, the relief valve seat positioned between the relief valve retention ring and the central aperture. A retainer is affixed the diaphragm to a guide, the retainer being disposable with the central aperture of the diaphragm and has a flange engagable with the top surface of the diaphragm. A relief valve has a valve stem, the relief valve seatable on the relief valve seat and retained at least partially by the relief valve retention ring, and the valve stem extending through the retainer and the guide away from the diaphragm.

In yet another embodiment comprised of an diaphragm assembly for use in a flush valve, the diaphragm assembly comprises a diaphragm having a substantially cylindrical shape with a top surface, a bottom surface, and a side, with a radius of the diaphragm being substantially greater than a height of the diaphragm. The diaphragm has a central aperture positioned substantially centrally through the diaphragm. A plurality of by-pass apertures are disposed in the diaphragm, the plurality of by-pass apertures comprising passages through the diaphragm. A plurality of by-passes is included with each by-pass aperture having a by-pass associated therewith and retainably disposable therein. A relief valve retention ring circumscribes the central aperture and extends from the top surface of the diaphragm. The relief valve retention ring has a plurality of relief valve guides protruding from an inner surface of the relief valve retention ring towards the central aperture. A relief valve seat is positioned on the top surface, the relief valve seat positioned between the relief valve retention ring and the central aperture.

The invention includes certain features and combinations of parts hereinafter fully described, illustrated in the accompanying figures, described below, and particularly pointed out in the appended claims, it being understood that various changes in the details may be made without departing from the spirit, or sacrificing any of the advantages of the present invention.

DETAILED DESCRIPTION OF THE PREFERRED EMBODIMENTS

Diaphragm-type flushometers having a single bypass orifice and multiple assembled kit parts are well known, as taught in U.S. Pat. Nos. 6,616,119; 5,967,182; 5,887,848; 5,490,659; 5,213,305; and 5,332,192 and incorporated herein by reference. The invention has application for all fixtures utilizing a diaphragm flush valve, including traditional volume fixtures. However, it should be appreciated that the diaphragm assembly described herein has substantial advantages for reduced water consumption fixtures, also referred to as High Efficiency Urinals ("HEU") and High Efficiency Toilets ("HET"). However, it should be understood that the improved diaphragm of the present invention can likewise improve performance of flushometers of various volumes per flush and is not unique to improvement of low flushing fixtures.

Figure 1:
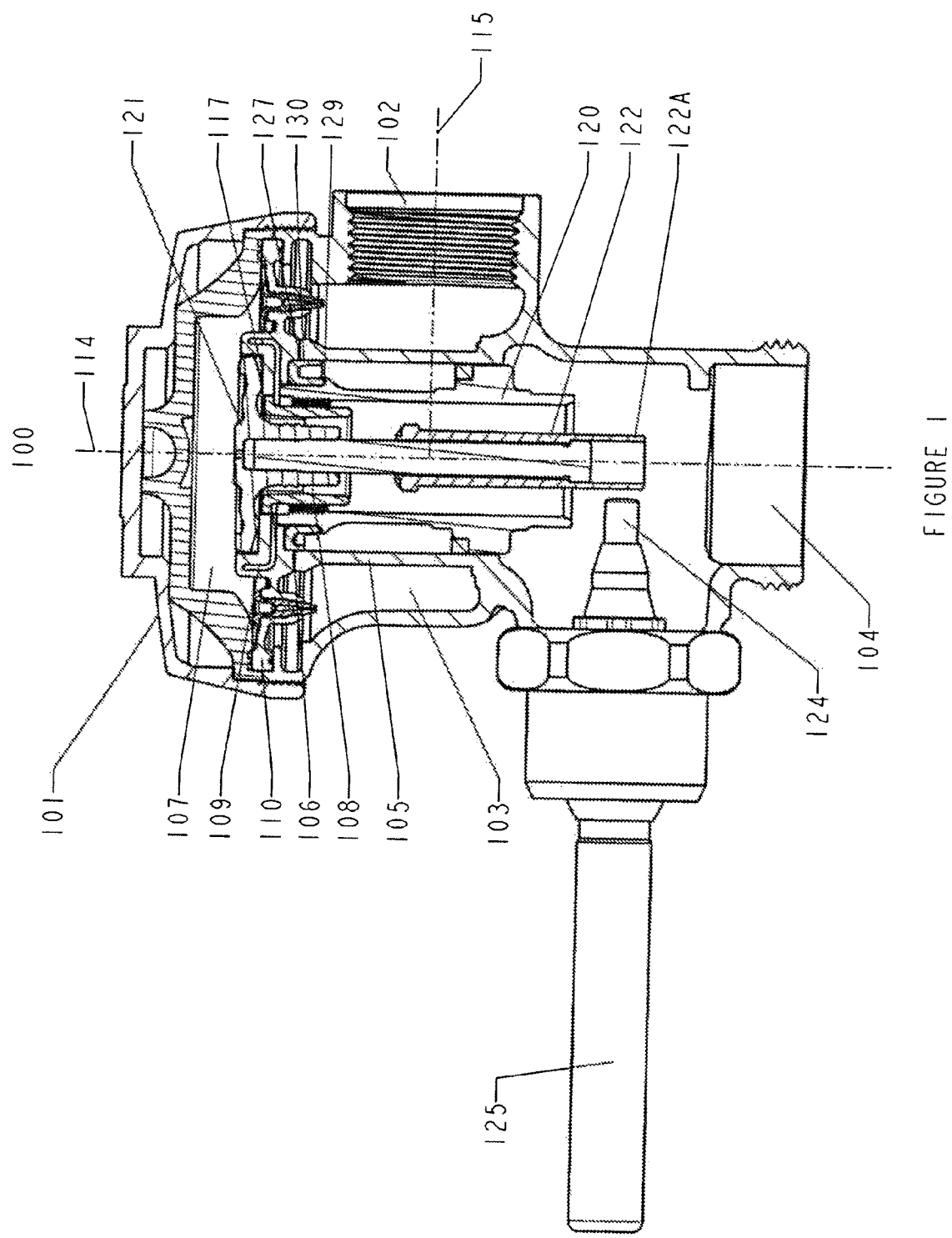
FIG. 1 is a cross-sectional view of a prior art flush valve.

While the diaphragm assembly described herein may be used in various flush valves, FIG. 1 illustrates a flush valve system 100 in which the diaphragm assembly 110 described herein may be used. As shown in FIG. 1, the flush valve includes a flush valve 101 having an inlet 102 and an outlet 104. A diaphragm assembly 110 is positioned to separate the inlet 102 and outlet 104 and to regulate the flow therebetween.

In continued reference to FIG. 1, a barrel 105 forms a pathway between the inlet 102 and outlet 104. Typically the flush valve body 101 is elongated along its vertical (longitudinal) axis 114 such that is taller than it is wide. Standard flush valve bodies generally utilize a side-entry inlet 102 (as depicted in FIG. 1) such that water enters the flush valve body 101 from the side, substantially parallel with the horizontal (lateral) axis 115 of the flush valve system 100. As also shown in FIG. 1, the outlet 104 is typically positioned at the "bottom" of the flush valve body 101. The barrel 105 forming the pathway between the inlet 102 and the outlet 104 is generally positioned substantially parallel to the vertical axis 114 of the flush valve system 100.

In one embodiment, the inlet 102 feeds water into an inlet chamber 103 that surrounds the barrel 105 and whose communication with the barrel 105 (and thus the outlet 104) is controlled by the diaphragm assembly 110. The diaphragm assembly 110 is positioned on the barrel 105 for controlling the flow of water from the inlet 102 through the outlet 104. Water from the inlet chamber 103 will flow "over" the top of the barrel 105 and into the interior of the barrel 105 to the outlet 104 when the diaphragm assembly 110 is "open", i.e. lifted off of the diaphragm seat 106.

In one embodiment of the diaphragm assembly 110, the diaphragm assembly 110 includes a flexible diaphragm 116. The diaphragm 116, in one embodiment, has a substantially disc-like shape with a top surface 116a, a bottom surface 116b, and a side or outer periphery 116c, with the outer diameter of the diaphragm 116 being substantially greater than a height (thickness) of the diaphragm 116. The diaphragm 116 is secured about its periphery 116c. In one embodiment, the diaphragm periphery 116c is secured to the valve body 101. The diaphragm 116 is seated on a diaphragm seat 106, which is an uppermost portion of the barrel 105. The diaphragm 116, when seated on the diaphragm seat 106, forms a seal that prevents water from passing from the inlet 102, via the inlet chamber 103, into an interior of the barrel 105 (and subsequently out through the outlet 104).

The operation of the diaphragm assembly 110 is controlled by the balance of pressures between the inlet chamber 103 and a control chamber 107. The control chamber 107 is defined as a portion of the interior of the flush valve body 101 above the diaphragm assembly 110 and opposite the inlet chamber 103, such that pressure of the control chamber 107 operates on the diaphragm 116 opposite the pressure from the inlet chamber 103 (typically due to the pressure of the water in the water supply line (not shown) itself). Thus, the inlet chamber 103 pressure operates to push the diaphragm 116 off the diaphragm seat 106, and the control chamber 107 pressure operates to press the diaphragm 116 to the diaphragm seat 106.

Figure 2:
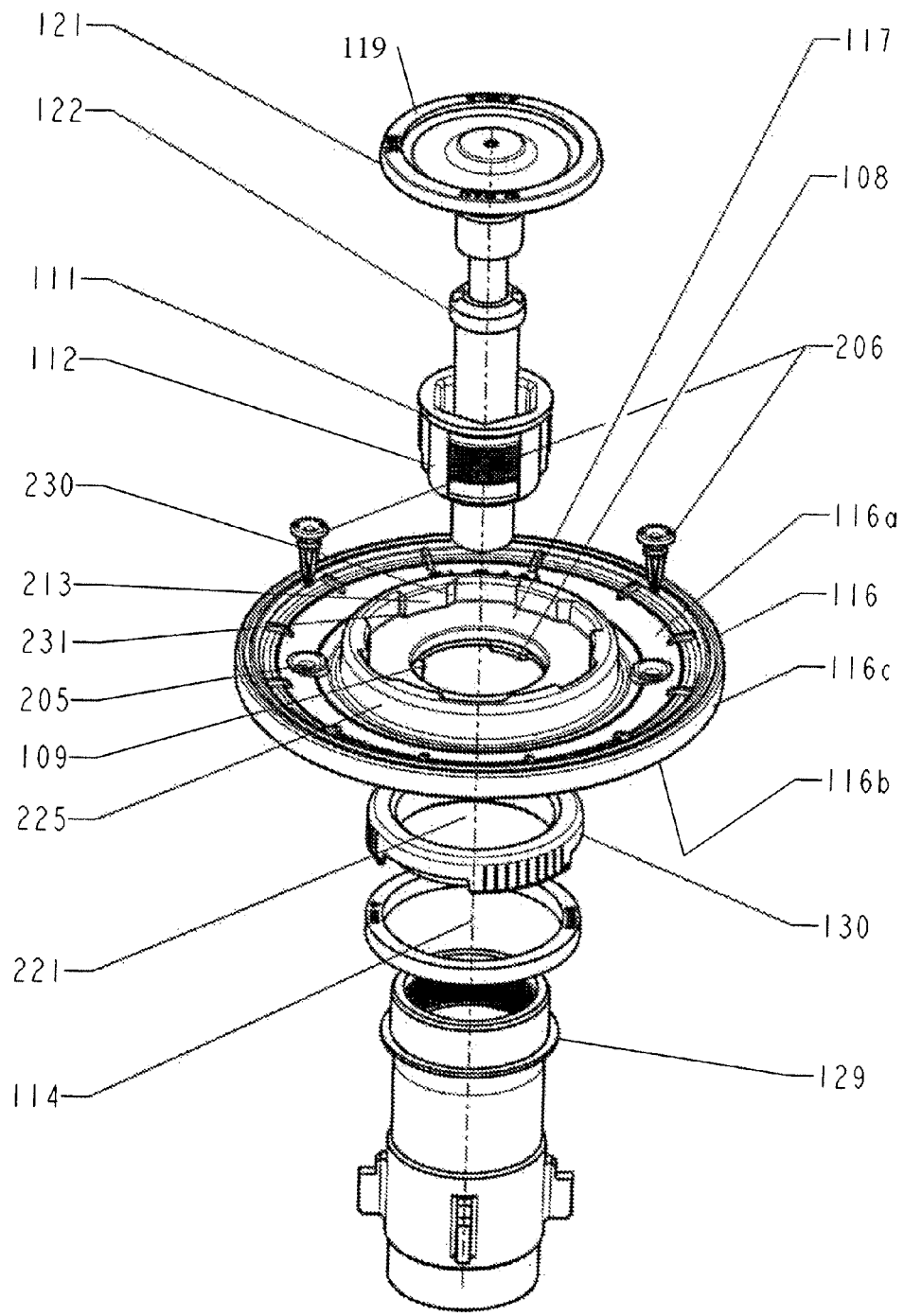
FIG. 2 is an exploded view of a flush valve diaphragm assembly.
Figure 4:
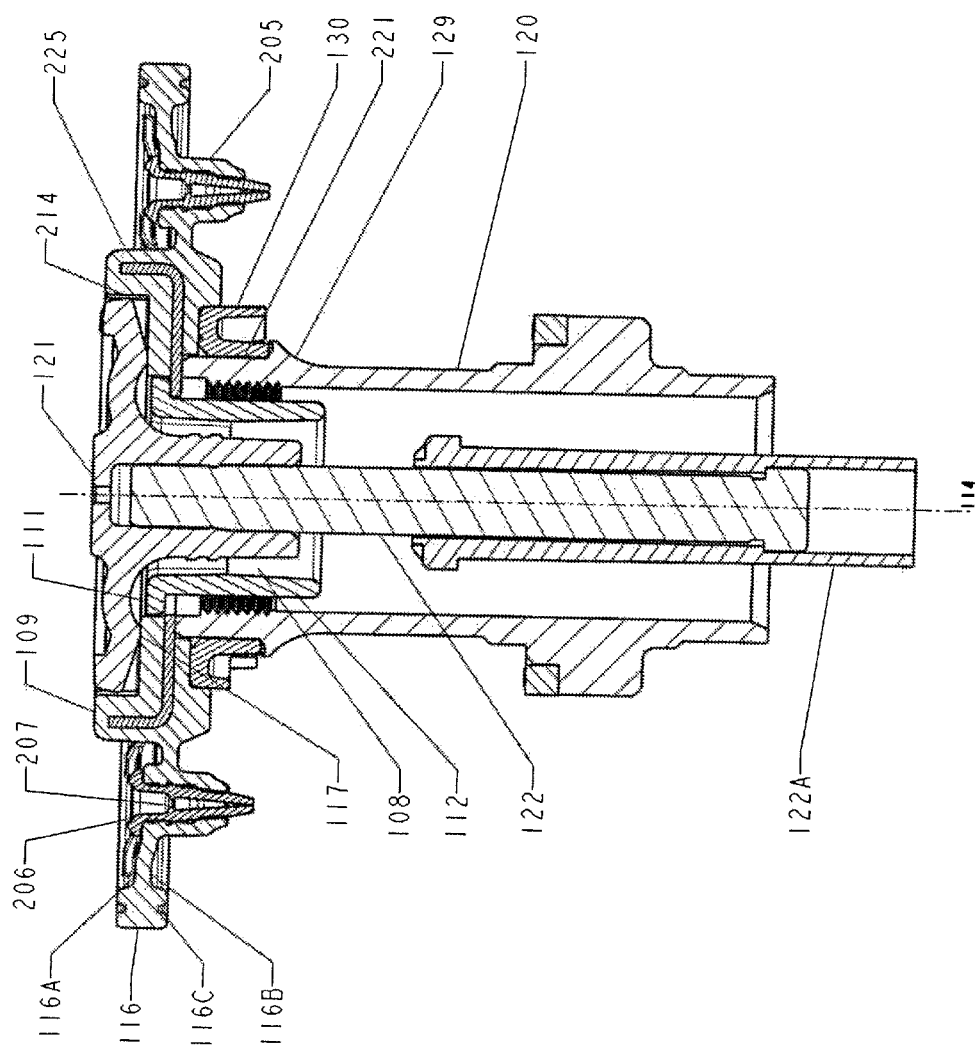
FIG. 4 is a cross-sectional view of a diaphragm assembly including a diaphragm, relief valve, and guide.

As shown in FIGS. 1, 2, and 4, in certain embodiments, the diaphragm assembly 110 includes a disc 109 integral to the diaphragm and forming a relief valve seat 117. The diaphragm assembly 110 includes a central aperture 108. In this embodiment, the relief valve assembly 119 includes a relief valve head 121 seated on the relief valve seat 117 and over the central aperture 108. The relief valve head 121 has a relief valve stem 122 extending therefrom through the diaphragm 116 and through guide 120. The guide 120 extends from the diaphragm 116 downwards towards the outlet 104 and is disposed within the barrel 105. In one embodiment, the guide 120 is affixed to the diaphragm assembly 110 such as via a retainer 112, which may be, for example, a threaded screw matching the threads on an inner portion of the guide 120 and having a flange 111 for retaining the diaphragm 116. In this embodiment, the relief valve stem 122 extends through the retainer 112 and the relief valve head 121 is seated over the retainer 112. The diaphragm 116 forms a seal at the diaphragm seat 106 as previously discussed, and the guide 120 extends downward therefrom through the barrel 105. The guide 120 is aligned with the aperture 108 of the diaphragm 116, such that a pathway from the pressure chamber 107 to the barrel 105 is defined.

Referencing FIG. 1, as stated, the relief valve head 121 is positioned within the aperture 108 of the diaphragm 116 for controllably sealing the control chamber 107 from the barrel 105. The relief valve head 121 seats upon the diaphragm 116 at the relief valve seat 117 to form a seal and includes a valve stem 122 that extends downward, through the guide 120, to a point where it is engagable with a plunger 124 in communication with a handle 125. The valve stem 122 is able to move a limited distance along the vertical axis 114 without unseating the relief valve head 121 from the relief valve seat 117. The valve stem 122 is positioned in the guide 120 and a lower end 122a of the valve stem 122 is unattached such that movement of the lower end 122a will pivot the valve stem 122 and exert force on the relief valve head 121.

In one embodiment (best shown in FIG. 1), at the upper portion of the barrel 105, a refill head 130 is disposed about the guide 120 between the barrel 105 and the guide 120. The refill head 130 has a central aperture 221, allowing the refill head 130 to be disposed about the guide 120. The guide 120 includes a refill head retention flange 129 for retaining the refill head 130 to the diaphragm 116. Thus, the refill head 130 is bounded, before the flush valve system 100 is activated, by the barrel 105, the guide 120 and the diaphragm 116. When the flush valve system 100 is activated, the refill head 130 moves up along the vertical axis 114 with the guide 120 (and a central portion of the diaphragm 116) such that it is bounded by the guide 120 and the diaphragm 116, but is substantially exposed to the intake chamber 103. Thus, as the diaphragm 116 continues its upstroke opening an annular passage 127 underneath the diaphragm 116, the refill head 130 rises as well. The refill head 130 allows the flow of the water initiated by the upstroke of the diaphragm 116 from the inlet chamber 103 through the barrel 105 and ultimately to the outlet 104. The shape of the refill head 130 determines the flow path of the water.

Actuation of the handle 125 slides the plunger 124, which engages the lower end of the valve stem 122, pivoting it, results in movement of the relief valve head 121 (typically tilting it) breaking the seal between the relief valve head 121 and the relief valve seat 117 on the diaphragm 116. The tilting of the relief valve head 121 vents the pressure in the control chamber 107 above the diaphragm assembly 110. The release of the pressure in the control chamber 107 releases the seal of the diaphragm 116 against the diaphragm seat 106, allowing water to flow from the inlet chamber 103 (which is replenished via the inlet 102) past the annular passage 127 over the diaphragm seat 106 of the barrel 105 into the interior of the barrel 105. This unseating of the diaphragm 116 is often referred to as the "upstroke" of the diaphragm 116, and the downward motion of the diaphragm 116 reseating is referred to as the "downstroke" with the entire cycle referred to as the "stroke" of the diaphragm 116. The stroke of the diaphragm 116 determines the time period that water can flow into the barrel 105 from the inlet chamber 103, which is constantly being filled by water from the inlet 102 and ultimately though the barrel 105 to the outlet 104 to accomplish the "flush".

In one embodiment, illustrated in FIG. 2 the diaphragm 116 is provided as part of a kit. The flushometer diaphragm kits are preferably made up of the diaphragm 116, a relief valve mechanism 119, diaphragm guide 120, optionally a refill ring (not shown), a retainer 112, and refill head 130. The diaphragm kit of the present invention includes, in one aspect, a plurality of bypasses 206, in another aspect a singular diaphragm 116 with integrated relief valve seat 117 (disk 109), and in yet another aspect an improved mechanism for sealing the components of the diaphragm kit via the use of retainer 112.

FIGS. 2 and 4 best illustrate one embodiment of the structure of the diaphragm assembly 110. The diaphragm assembly 110 includes a diaphragm 116 having a central aperture 108, as described above, for allowing passage of the relief valve stem 122 therethrough. In one embodiment, the central aperture 108 is adapted to receive a retainer 112 that engages the guide 120. As discussed above, in one embodiment the diaphragm 116 further includes a rigid disc 109 that the diaphragm 116 is molded about (best illustrated in cross-sectional FIGS. 1 and 4). The material above the disk 109 serves as the relief valve seat 122. The diaphragm 116 also includes at least two by-pass apertures 205 each for receiving a by-pass 206. In an alternative embodiment, at least three by-pass apertures 205 are provided. Each by-pass 206 has a passage 207 therethrough.

The at least two by-pass aperture 205 in the diaphragm 116 place the control chamber 107 in communication with the inlet chamber 103. The by-pass apertures 205 are adapted to receive a by-pass 206. The by-pass 206 includes a housing having a passage 207 therethrough. Each by-pass 206 is shaped to fit the by-pass aperture 205 in the diaphragm 116. It should be appreciated that various size passages 207 (passage diameter) may be utilized to provide for various flush profiles. The by-pass aperture 205 is spaced from the center aperture 108 of the diaphragm 116 sufficiently to provide sufficient water flow to the pressure chamber even during a flush cycle when the diaphragm 116 flexes upwards. It will also be appreciated that it is preferred, structurally, that the by-pass aperture 205 is spaced sufficiently from the periphery 116c of the diaphragm 116 and also from the central aperture 108 of the diaphragm 116.

In one embodiment, the multiple by-pass apertures 205 are equally spaced from one another. The equal spacing of the aperture 205 provides for a more even influx of water (and pressure) into the control chamber 107 (via the by-pass body 206 disposed in the aperture 205) than with a singular by-pass aperture or unequally spaced multiple apertures. A disadvantage of a single bypass is the angular orientation of the fixed aperture in the diaphragm 116 relative to the inlet 102. The local pressure within the valve body 101 and flow of the water in the inlet 102 and inlet chamber 103 within the flushometer body annulus can affect performance of the flushometer. This requires careful alignment during assembly and throughout the lifespan of the diaphragm 116. The uneven flow of water into the control chamber 107 and the pressurization of same can result in an uneven flexing of the diaphragm 116 resulting in increased wear and a shorter useful lifespan for the diaphragm 116.

The bypass aperture 205 provides communication between the control chamber 107 and the inlet chamber 103. Thus, the bypass orifices 206, in combination with the relief valve head 121 and relief valve stem 122, control, the pressure of the pressure chamber 107, which, in turn, controls the position of the diaphragm 116 and thus the flow of water past the annular passage 127 between the diaphragm 116 and diaphragm seat 106. Thus, fluid (and, in certain embodiments, some air) pressure above the diaphragm 116 in the control chamber 107 maintains pressure for closing and holding the diaphragm assembly 110 on the diaphragm seat 106 after flush operation. The by-pass passage 207 is sized to allow a rate of fluid flow through the diaphragm 116 before the flush valve closes. For embodiments having more than one bypass 206, the passages 207 therethrough are designed to, in total, allow a rate of fluid flow through the diaphragm 116.

In a particular embodiment, shown in FIG. 2, a diaphragm 116 with multiple by-passes 206 provides for having improvements for a better performing flushometer diaphragm kit assembly 110.

As previously mentioned, in one embodiment shown in FIG. 4, the diaphragm 116 of the present invention is a singular, or integrated, component including the relief valve seat 117 for the relief valve head 121. This unitary construction provides for increased control over the total flush volume and the volume per time by eliminating substantial variability that was inherent in prior art two-piece designs. In one embodiment, the diaphragm 116 comprises a disc 109, for example, constructed, for example, of a metal, which is over-molded with an elastomeric material to form the outer portion 225. In one embodiment, the disc 109 surrounds the central aperture 108 but extends only to the relief valve retention ring 214 while the elastomeric material overcoats the disc 109 and relief valve retention ring 214 and also forms the extended peripheral portion, which contains the by-pass apertures of the diaphragm 116. In one embodiment shown in FIG. 4, the relief valve retention ring 214 and disc 109 both are formed from the same rigid material and over-molded with the elastomeric material to form the outer portion 225.

The relief valve retention ring 214, against which the relief valve head 121 abuts during use, is backed by a rigid core material, in one embodiment being the same material as the diaphragm core, thus providing for a more supportive cavity to retain the relief valve head 121. This increased rigidity also results in improved performance as the prior art rubber-only design is prone to being pushed out of shape over time. The diaphragm 116 and relief valve seat 117 also includes an embodiment with a connecting piece extending from the diaphragm 116 opposite the disc. The outer portion of the connecting piece may be threaded to allow engagement with the flush valve. In one embodiment the connecting piece forms a single metallic component with the metallic portion of the diaphragm/disk unitary piece (diaphragm 116). In an alternative embodiment the diaphragm/disk unitary piece (diaphragm 116) is affixed to the kit with a separate connection component, such as the retainer 112. This connection component may be of a different material from either the metal or elastomer from the diaphragm/disk unitary piece (diaphragm 116), such as a material of plastic. This material selection allows for greater cost control in manufacturing. In addition the use of a separate connection component allows for a simpler metallic portion to be used in the diaphragm/disk unitary piece (diaphragm 116), such as one that can be manufactured with, for example, a punch press and again allowing for greater cost control in the manufacturing process.

Figure 3:
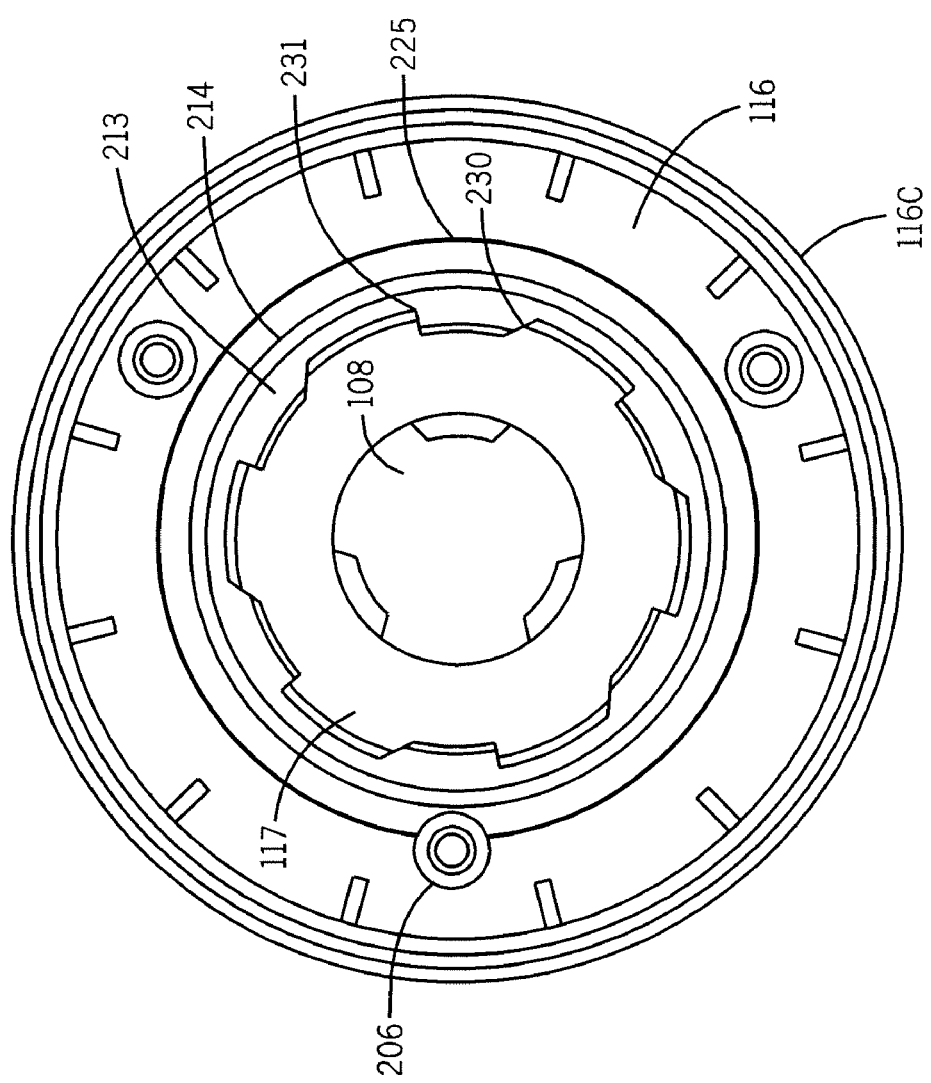
FIG. 3 is a top view of a flush valve diaphragm.

Referring to FIGS. 2 and 3, the relief valve retention ring 214 includes, in one embodiment, a plurality of lugs 213 for centrally locating a seated relief valve head onto the relief valve seat 117. In one embodiment, there are at least six lugs 213. The lugs 213 provide for a snug fit between the relief valve retention ring 214 and relief valve head 121. It is necessary to retain spacing between the relief valve retention ring 214 and relief valve head 121 in order to allow the relief valve head to be able to tilt sufficiently to allow water to flow out of the upper control chamber. Without sufficient spacing in this area, the relief valve will not function properly when a user activates the flush cycle. Conversely, too much space, i.e. from insufficient lugs or lugs of insufficient size relative to the spaces therebetween, will result in the relief valve head 121 having to much "play" within the seating area. This play will result in an imprecise functioning of the flushometer. Integrating the disc 109 with the diaphragm 116 also eliminates an otherwise large and unreliable sealing area between the top of the diaphragm 116 and the bottom of the disc 109.

With continued reference to FIG. 4, the lugs 213 have corners which are on the upper and inner portion of the relief valve retention ring 214. In one embodiment, the left handed corners of the lugs have an angular shape 230, while the right handed corners have a rounded shape 231. The angular corners allow the use of the relief valve retention ring 214 to secure the diaphragm to the flushometer by providing an edge for either an automatic tool or a manual tool for engagement. In contrast the rounded corners have the opposite effect, making it more difficult to remove the diaphragm 116 from its original factory setting. Thus, in one embodiment, there are a plurality of equally spaced lugs 213, each of the equally spaced lugs 213 including a first end proximate a second end of the adjacent lug 213, one of the first end or the second end having an angular shaped 230 with the other having a rounded shape 231.

The outer portion of the relief valve retention ring 214 has in one embodiment, a slightly slanted or curved lower portion such that it slopes towards the center of the diaphragm 116. This provides improved component life and performance over time by allowing the elastomeric diaphragm 116 sufficient space to move in response to pressure. In contrast, prior art diaphragms were secured to a disk that presented a flat bottom surface and an annular angular edge. The interaction of the diaphragm 116 against these surfaces over repeated operations and pressure conditions would result in wear and poor performance. Prior art assemblies also had the seat and diaphragm two separate pieces which introduced a potential leak surface between the two parts. The integrated seat and diaphragm 116 removes this sealing area and potential leak because of incompletely assembled parts.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A flush valve system comprising:
   a flush valve body having a water inlet and a water outlet, the water inlet positioned on a side of the flush valve body and the water outlet positioned at a bottom of the flush valve body;
   a barrel having a hollow passage and disposed within the flush valve body, the barrel forming a vertical pathway for water from the water inlet to pass to the water outlet, a skirt of the barrel and the flush valve body in communication to form a seal between the water inlet and the water outlet and defining an inlet chamber;
   a diaphragm disposed at an upper end of the barrel, sealing the inlet chamber from the hollow passage and defining a control chamber above the diaphragm;
   the diaphragm having a top surface, a bottom surface, and a side and having a central aperture defining a disc and a relief valve retention ring circumscribing the central aperture and fixedly extending from the top surface of the diaphragm, the disc and the relief valve retention ring both include a unitary rigid insert, the diaphragm further including at least one by-pass aperture through the diaphragm positioned between the side of the diaphragm and the relief valve retention ring, each of the at least one by-pass aperture configured to retain a by-pass, the by-pass providing a passage from the inlet chamber to the control chamber allowing equilibration of pressure;
   a relief valve seat positioned on the top surface, the relief valve seat positioned about the central aperture; a relief valve seated on the diaphragm and having a valve stem extending downward therefrom through the diaphragm into and extending beyond a guide; and
   the guide coupled to the diaphragm and extending downward from the diaphragm into the barrel, the guide being a generally cylindrical hollow tube in communication with the central aperture.

2. The flush valve system of claim 1, further wherein the at least one bypass aperture includes a plurality of by-pass apertures and wherein the plurality of by-pass apertures are spaced equidistant from each other.

3. The flush valve system of claim 2, wherein the plurality of by-pass apertures comprise at least three by-pass apertures.

4. The flush valve system of claim 1, wherein the at least one by-pass "snap-fits" into the by-pass aperture.

5. The flush valve system of claim 1, wherein the relief valve retention ring includes a curved outer lower portion which curves towards the central aperture such that the curved outer lower portion is convex.

6. The flush valve system of claim 1, further comprising the relief valve retention ring having a plurality of relief valve lugs protruding from an inner surface of the relief valve retention ring towards the central aperture.

7. The flush valve system of claim 6, wherein the relief valve lugs comprise a plurality of equally spaced lugs.

8. The flush valve system of claim 7, wherein each of the equally spaced lugs includes a first end proximate a second end of an adjacent lug, one of the first end or the second end having an angular shaped with the other having a rounded shape.

9. A diaphragm assembly for use in a flush valve, the diaphragm assembly comprising:
a diaphragm having a substantially cylindrical shape with a top surface, a bottom surface, and a side, with a radius of the diaphragm being substantially greater than a height of the diaphragm;
the diaphragm having a central aperture positioned substantially centrally through the diaphragm and a relief valve retention ring circumscribing the central aperture and extending from the top surface of the diaphragm, the diaphragm top surface, bottom surface, side and central aperture define a disc, the disc and the relief valve retention ring both include a unitary rigid insert;
a plurality of by-pass apertures are disposed in the diaphragm, the plurality of by-pass apertures comprising passages through the diaphragm; and
a plurality of by-passes, each of the plurality of by-pass apertures having a by-pass associated therewith and retainably disposable therein;
wherein the relief valve retention ring and the diaphragm are a single structure.

10. The diaphragm of claim 9, wherein the diaphragm comprises and a flexible outer portion.

11. The diaphragm of claim 9, wherein the relief valve retention ring and the diaphragm include a rigid metallic core overcoated with a flexible material.

12. The flush valve system of claim 9, wherein the relief valve retention ring includes a curved outer lower portion which curves towards the central aperture such that the curved outer lower portion is convex.

13. The diaphragm assembly of claim 9 further comprising the relief valve retention ring having a plurality of relief valve lugs protruding from an inner surface of the relief valve retention ring towards the central aperture.

14. The flush valve system of claim 13, wherein the lugs comprise a plurality of equally spaced lugs, each of the equally spaced lugs including a first end proximate a second end of an adjacent lug, one of the first end or the second end having an angular shaped with the other having a rounded shape.

15. The diaphragm assembly of claim 9 further comprising a relief valve seat positioned on the top surface, the relief valve seat positioned between the relief valve retention ring and the central aperture.

16. A flush valve system comprising:
a flush valve body having a water inlet and a water outlet, the water inlet positioned on a side of the flush valve body and the water outlet positioned at a bottom of the flush valve body;
a barrel having a hollow passage and disposed within the flush valve body, the barrel forming a vertical pathway for water from the water inlet to pass to the water outlet, a skirt of the barrel and the flush valve body in communication to form a seal between the water inlet and the water outlet and defining an inlet chamber;
a diaphragm disposed at an upper end of the barrel, sealing the inlet chamber from the hollow passage and defining a control chamber above the diaphragm;
the diaphragm having a top surface, a bottom surface, and a side and having a central aperture;
a relief valve retention ring circumscribing the central aperture and extending from the top surface of the diaphragm;
the relief valve retention ring having a plurality of relief valve lugs protruding from an inner surface of the relief valve retention ring towards the central aperture; and
a relief valve seat positioned on the top surface, the relief valve seat positioned between the relief valve retention ring and the central aperture; a relief valve seated on the diaphragm and having a valve stem extending downward therefrom through the diaphragm into and extending beyond a guide; and
the guide coupled to the diaphragm and extending downward from the diaphragm into the barrel, the guide being a generally cylindrical hollow tube in communication with the central aperture.

17. The flush valve system of claim 16, wherein the diaphragm further includes a plurality of by-pass apertures therethrough, each of the plurality of by-pass apertures configured to retain a by-pass, the by-pass providing a passage from the inlet chamber to the control chamber allowing equilibration of pressure.

18. The flush valve system of claim 16, wherein the relief valve lugs comprise a plurality of equally spaced lugs.

19. The flush valve system of claim 16, wherein each of the equally spaced lugs includes a first end proximate a second end of an adjacent lug, one of the first end or the second end having an angular shaped with the other having a rounded shape.

20. The flush valve system of claim 16, wherein the relief valve retention ring includes a curved outer lower portion which curves towards the central aperture such that the curved outer lower portion is convex.

* * * * *